(12) United States Patent
Sherwood et al.

(10) Patent No.: US 11,954,393 B2
(45) Date of Patent: *Apr. 9, 2024

(54) INFORMATION REDIRECTION SYSTEM TO AND FROM THE INTERNET, MOBILE DEVICES AND NETWORKS

(71) Applicants: Mary Lynn Sherwood, Escondido, CA (US); Bruce Lawrence Hall, Escondido, CA (US)

(72) Inventors: Mary Lynn Sherwood, Escondido, CA (US); Bruce Lawrence Hall, Escondido, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,911

(22) Filed: May 3, 2022

(65) Prior Publication Data
US 2022/0342621 A1    Oct. 27, 2022

Related U.S. Application Data

(63) Continuation of application No. 16/666,366, filed on Oct. 28, 2019, now Pat. No. 11,321,036, which is a continuation of application No. 15/824,336, filed on Nov. 28, 2017, now Pat. No. 10,481,840, which is a continuation of application No. 14/793,676, filed on Jul. 7, 2015, now Pat. No. 9,830,115, which is a continuation of application No. 12/315,129, filed on Nov. 29, 2008, now Pat. No. 9,098,213.

(60) Provisional application No. 61/004,828, filed on Nov. 30, 2007.

(51) Int. Cl.
*G06F 3/12* (2006.01)
*H04N 1/00* (2006.01)

(52) U.S. Cl.
CPC ....... *G06F 3/1296* (2013.01); *H04N 1/00209* (2013.01); *H04N 1/00236* (2013.01)

(58) Field of Classification Search
CPC .............. G06F 3/1296; H04N 1/00209; H04N 1/00236
USPC ................................................. 358/1.1, 1.18
See application file for complete search history.

(56) References Cited

U.S. PATENT DOCUMENTS

| | | |
|---|---|---|
| 5,239,166 A | 8/1993 | Graves |
| 5,739,512 A | 4/1998 | Tognazzini |
| 6,745,936 B1 | 6/2004 | Movalli et al. |
| 6,927,869 B1 | 8/2005 | Simpson |
| 9,098,213 B1 | 8/2015 | Stewart |
| 11,321,036 B2 * | 5/2022 | Sherwood ............. G06F 3/1296 |
| 2002/0181010 A1 | 12/2002 | Pineau |
| 2003/0115135 A1 | 6/2003 | Sarfraz et al. |
| 2005/0009560 A1 | 1/2005 | Cavill |
| 2007/0069013 A1 | 3/2007 | Seifert et al. |

(Continued)

*Primary Examiner* — Gabriel I Garcia
(74) *Attorney, Agent, or Firm* — Jonathan Kidney; Intelink Law Group, P.C.

(57) ABSTRACT

Previous information generating devices or printers were designed to print a paper copy of data and/or receipts which causes a disconnect with modern day data manipulation. This information redirector can redirects generated data to and receive data from the internet and hand held devices which will open up extremely fast data exchange and data manipulation for consumers, cities, states and the federal government without the expense of having to purchase complete new systems. By simply adding the redirector we can connect all old computer systems with modern day systems that now have the ability to manipulate data automatically.

25 Claims, 9 Drawing Sheets

(56) References Cited

U.S. PATENT DOCUMENTS

| | | |
|---|---|---|
| 2007/0182984 A1 | 8/2007 | Ragnet et al. |
| 2007/0290031 A1 | 12/2007 | Singh |
| 2008/0102892 A1 | 5/2008 | Louks |
| 2009/0006151 A1 | 1/2009 | Zarghami et al. |
| 2012/0019858 A1 | 1/2012 | Sata |
| 2015/0036189 A1 | 2/2015 | Shiraga |

* cited by examiner

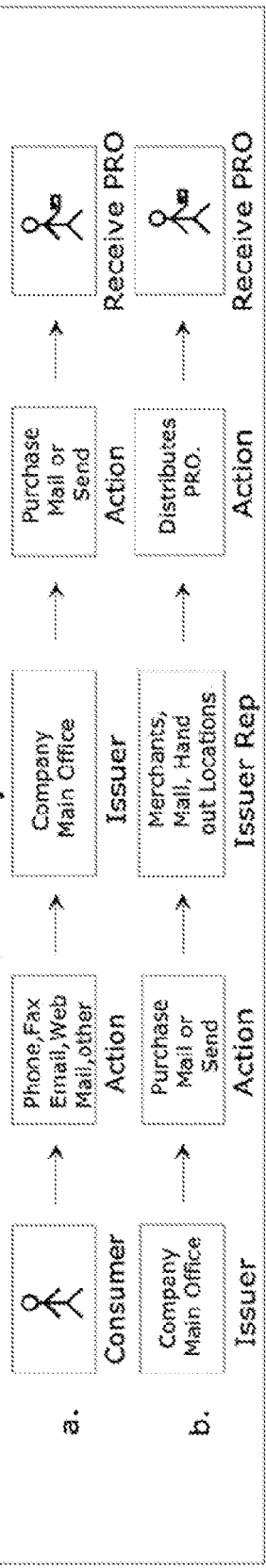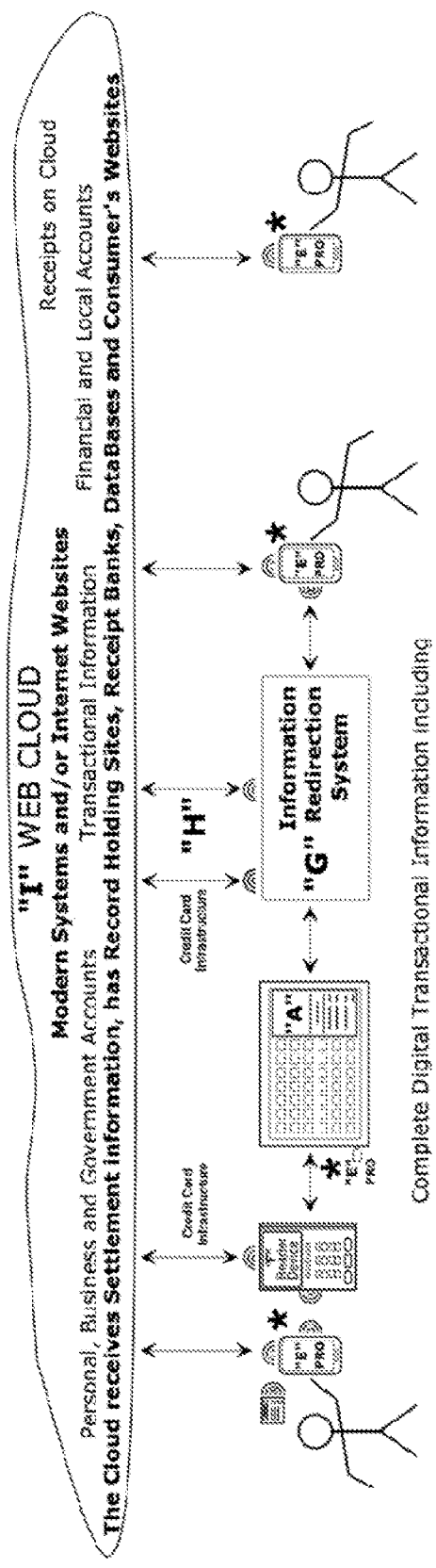
FIG. 3

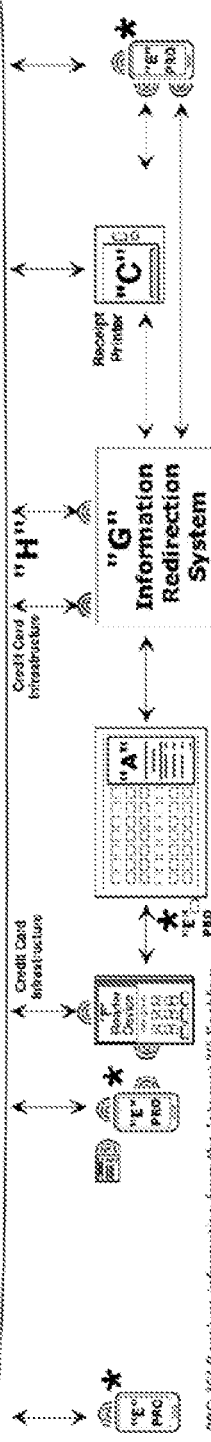
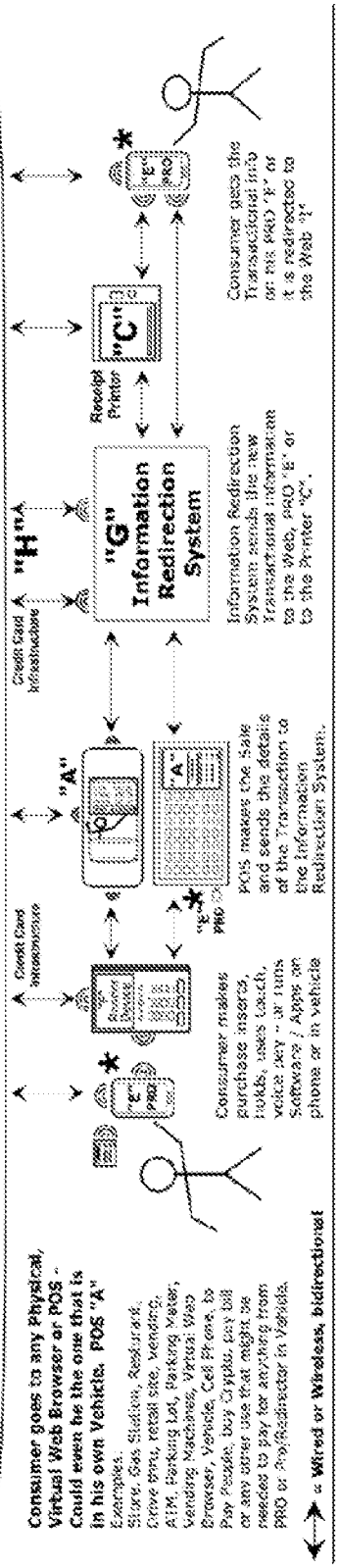
FIG. 4

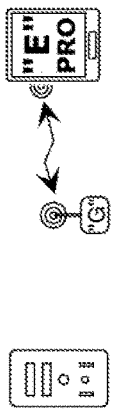

PRO & Information Redirection System – Modern Devices & Internet Examples

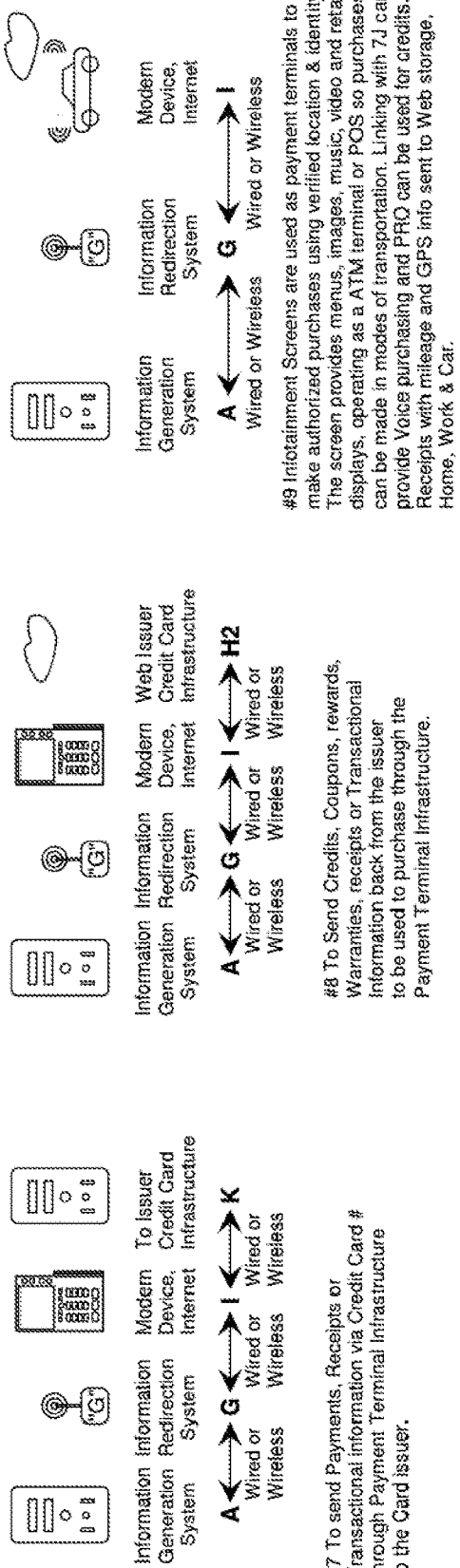
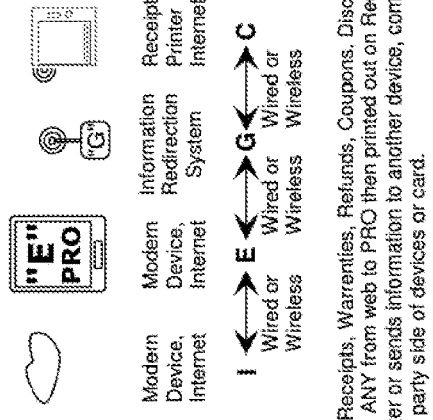
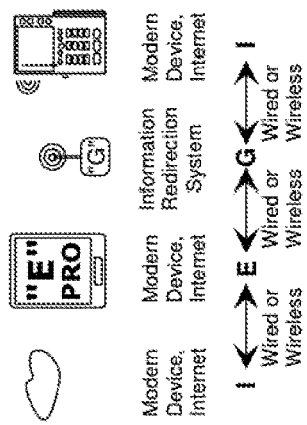
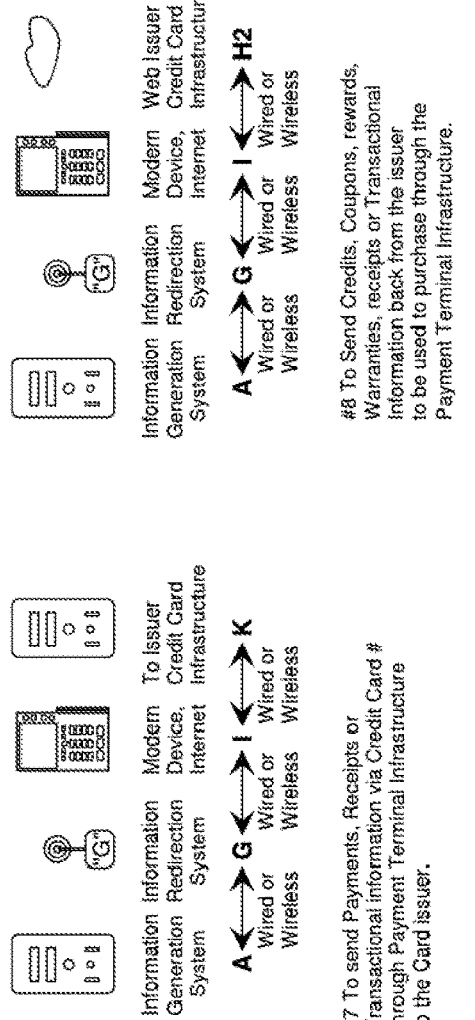
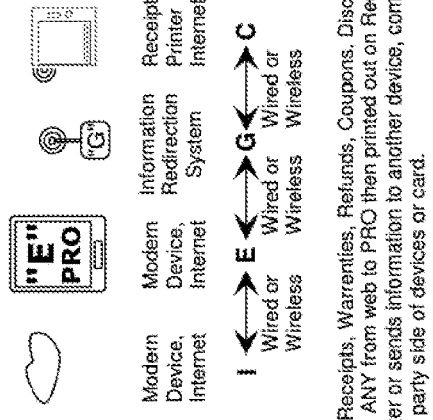
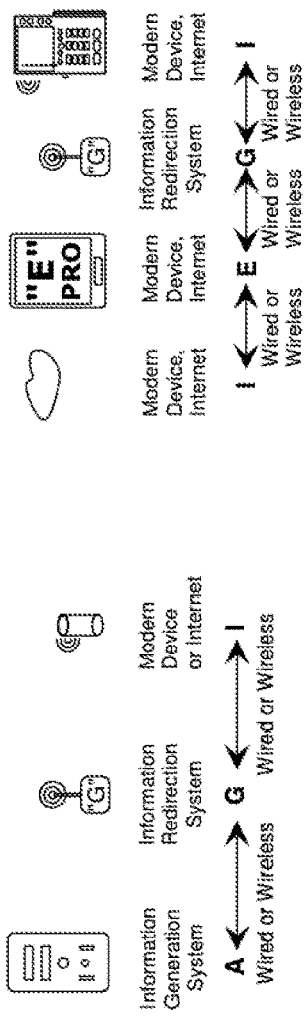

Fig. 7G

7 To send Payments, Receipts or Transactional information via Credit Card # through Payment Terminal Infrastructure to the Card Issuer.

Fig. 7H

8 To Send Credits, Coupons, rewards, Warranties, receipts or Transactional information back from the issuer to be used to purchase through the Payment Terminal Infrastructure.

Fig. 7I

9 Infotainment Screens are used as payment terminals to make authorized purchases using verified location & identity. The screen provides menus, images, music, video and retail displays, operating as a ATM terminal or POS so purchases can be made in modes of transportation. Linking with 7J can provide Voice purchasing and PRO can be used for credits. Receipts with mileage and GPS info sent to Web storage, Home, Work & Car.

Fig. 7J

10 Personal Digital Assistant – PDA or Voice Control Unit can be used with 7I for purchases inside modes of transportation. Check what receipts were uploaded to the web or web receipt bank. Credits can be used from PRO or Car infotainment for purchases.

Fig. 7K

11 Credit from Web or PRO sent to Payment Terminal to make purchases. Transaction information can be to moder device, card or third party site or mode of transportation.

Fig. 7L

12 Receipts, Warrenties, Refunds, Coupons, Discount Ads, ANY from web to PRO then printed out on Receipt Printer or sends information to another device, computer, third party side of devices or card.

INFORMATION REDIRECTION SYSTEM TO AND FROM THE INTERNET, MOBILE DEVICES AND NETWORKS

CROSS-REFERENCE TO RELATED APPLICATION(S)

This application is a continuation of and claims the benefit of U.S. patent application Ser. No. 16/666,366, filed Oct. 28, 2019 which is a continuation of U.S. patent application Ser. No. 15/824,336, filed Nov. 28, 2017, issued as U.S. Pat. No. 10,481,840 on Nov. 19, 2019, which is a continuation of U.S. patent application Ser. No. 14/793,676, filed Jul. 7, 2015, issued as U.S. Pat. No. 9,830,115 on Nov. 28, 2017, which is a continuation of U.S. patent application Ser. No. 12/315,129, filed Nov. 29, 2008, issued as U.S. Pat. No. 9,098,213 on Aug. 4, 2015, both titled "A PRINTER INTERFACE FOR PRINTING DATA AND/OR RECEIPTS TO AND FROM HAND HELD DEVICES," claiming priority to Provisional Application No. 61/004,828, filed Nov. 30, 2007, the contents of which are hereby incorporated by reference in their entirety.

BACKGROUND

The data that old systems contain is very valuable and needs to be used with modem day systems. It would be very costly and time consuming to try to redesign and reprogram all the old systems to output their data to modem day systems. It is equally or even more costly and time consuming to try to print the data to paper and then have to re-enter all the data into the new systems. Since existing printers were designed to output data to paper, they are considered a closed end system with data in and paper out.

SUMMARY

Printers have always been "end of line devices." The only function of a printer is to print on paper. We have researched the patents and have found no patent that even remotely describes our invention of using a printer system to connect old systems to new modem day systems. The following patents come the closest with the "reuse of data" but even this is about reprogramming the existing system and transferring the data to another paper printer using a network. Our Invention does not change an existing system or use the network of any existing system. Using our invention, the existing system works exactly the same but can be connected to modem day systems by simply printing. From our research it seems that no one has thought to use a printer system to connect systems. The following are the patents that come the closest:

| USPTO# | Name | Date |
| --- | --- | --- |
| 7,423,773 | Saeki | Sept 9, |
| 6,842,263 | Saeki | Jan 11, |
| 7,352,487 | Tokashiki | April 1, |
| 7,406,577 | Kaneda | July 29, |

However, since the older computer systems are already programmed to output their data to paper, we have invented a way to "Print" this data automatically into new modem day systems. Using our new Printer System, we can now connect all old systems with modem day systems by just printing to our new "Data Printer System". This new Printer system will take the data from old systems and "Print" it to the internet and/or to databases and/or to hand held devices so it can be used in new systems.

This new and novel printer system will enable old systems that output data to paper to cause this information to be received from and transmitted to a consumer and/or computer network electronically. This data printer system can also print to and receive from the internet automatically.

The ability to do this will open up extremely fast data exchange and data manipulation. Access to this data was not possible before without redesigning and reprogramming all older computer systems.

Using this printer system, previous paper data and or receipts can be electronic and be digitally searched, sorted, categorized and totaled automatically. The data can be used in anyway necessary for accounting, taxes, product returns, rebates, warranties or any other use that may come up.

In various aspects of the disclosure, a printout redirection system is provided, requiring no alteration of the printout generating device, comprising: a first device, generating printout information, wherein the printout information is sent for printout to an attachable printer; a wired connection with a first side connected to the first device and a second side configured to connect to an attachable printer, the wired connection conveying the printout information; a printout redirector, comprising: a receiver connected to the wired connection's second side and receiving the printout information from the first device; a wireless transmitter configured to transmit the received printout information to a portable device with software managing a target-destination information and connected to a network; and a wireless receiver configured to receive the target-destination information from the portable device or the network, wherein printout information from the first device intended for the attachable printer can be wirelessly transmitted directly to the portable device and either directly or indirectly to the network without requiring a modification to the first device.

In other aspects of the disclosure, the printout redirector system above is provided, wherein the target-destination information is originated from a cell phone, a card reader, or a computer connected to the network; and/or wherein the target-destination information is originated from a software program resident on the portable device, a cell phone, a flash drive, a memory card, or a computer connected to the network; and/or wherein the printout information is in a digital format, adapted for one or more of sorting, searching, or formatting; and/or wherein the printout information constitutes a receipt, rebate, ticket, invoice, personnel information, warranty, product information, or image; and/or wherein the printout information is utilized in a report, tax document, accounting, or any use; and/or wherein the printout information is bi-directionally conveyed via one or more of electrical contact means, wireless transmission means, or Bluetooth; and/or further comprising an electronic receipt bank connected to the network, wherein the printout information is deposited to the receipt bank; and/or wherein the printout information is printable to any device that is connected to the print redirector or the network; and/or wherein the first device is a payment or transaction terminal; and/or wherein the first device is located in a mode of transportation and location information is tabulated with printout information; and/or further comprising a financial service or bank connected to the network, wherein the printout information is at least one of settlement information including an amount of refund or money due to a transacting party, the amount being transmitted to the financial service or bank; and/or wherein the printout information is in an encrypted form prior to transmission or decrypted form after receipt; and/or wherein the print redirector is utilized in a existing credit or transaction processing system; and/or wherein the printout information is forwarded in an email, text message, or facsimile to a recipient device connected to the network, a cell phone network; and/or wherein the printout information is in a form of at least one of a musical data file, voice data file, image file and video data file; and/or wherein the first wired connection is a data port; and/or wherein a time stamp, date, activity location, activity code, and merchant number is in the printout information and a servicing computer connected to the network validates the printout information as authentic.

BRIEF DESCRIPTION OF THE DRAWINGS

FIG. 3 shows how a consumer may obtain a hand held device and how a consumer may receive settlement information on a hand held device after making a purchase.

FIG. 4 shows how a consumer may use the printer interface to transfer information to a hand held device enabling the consumer to engage in further transactions.

FIG. 7A shows "A" with a printer port being "plugged into" by "G, communicating wirelessly to "I".

FIG. 7B shows similar configuration to FIG. 7A, but "G" is connected via a wire/cable.

FIG. 7C shows similar configuration to FIG. 7B, but "I" is replaced by a modern device.

FIG. 7D shows similar configuration to FIG. 7C, but "I" is replaced by a modern device.

FIG. 7E shows "I" replaced by a modern device, shown here as a modern printer.

FIG. 7F is similar to FIG. 7C, however, the modern device is understood to be programmable.

FIG. 7G is an extension of FIG. 7D, where modern device "I" is integral or related to "K".

FIG. 7H is another extension of FIG. 7D, where modern device "I" is connected to the Internet "H2".

FIG. 7I is another embodiment, where the modern device "I" is located in vehicle.

FIG. 7J is another embodiment, where modern device "I" is a personal digital assistant (PDA) or similar device (including a voice-controllable device).

FIG. 7K is another embodiment, where the modern device is a combination of "E"+"I" (physical portable device with Internet) that interacts with the new printer system "G".

FIG. 7L is a modification of the embodiment shown in FIG. 7K, where the new printer system "G" is connected to a receipt printer "C".

DETAILED DESCRIPTION

This invention has many uses for connecting old paper output systems to modem systems, devices, databases and the Internet. The following is only one detailed example of use that describes this invention but the example clearly shows how this invention can be used in other similar ways.

Existing printers print a receipt on paper for the consumer that represents the consumer's transaction. These receipts can get lost, torn, smudged, or turn black from too much heat causing them to be unreadable or unusable. Receipts are extremely important in proving the sale took place. They are important for returns, rebates, accounting, warranties and taxes.

The IRS demands a copy of the transaction as proof for deductions against taxes. If a taxpayer does not have a clear and readable receipt or copy, the taxpayer could be forced to pay more taxes than they actually owe. The other side is also true, with today's paper system there is no way to validate that the receipt is from the taxpayer. The IRS could be forced to accept a receipt that the taxpayer found or was given; therefore it is the Government that is loosing out on taxes owed.

This new system would be fair to all and would speed up audits and make it easier for everyone including the IRS, accountants and Taxpayers.

Another problem with receipts on paper is in accounting. Consumers end up with numerous shoe boxes full of receipts that they have to sort, categorize, and total and then have to manually enter these amounts in an accounting system or tax program for yearly taxes.

This is confusing, extremely inefficient, time consuming and costly, especially if the consumer has to pay an accountant to do the work. Since all receipts have totally different formats and layouts, it is very frustrating, difficult and time consuming to manually search for item names, item categories, store names, dates, times, amounts, taxes paid, locations of the establishment (especially if using out of town deductions), etc. Whereas Electronic sorting is almost instantaneous for all.

Transmitting and receiving this information to and from the consumer could be done in two basic ways. The first way is physically.

If sent physically then the consumer could carry A PORTABLE RECORD ORGANIZER device or (PRO) that would be able to receive and transmit information to and from the new printer system.

Figure 1:
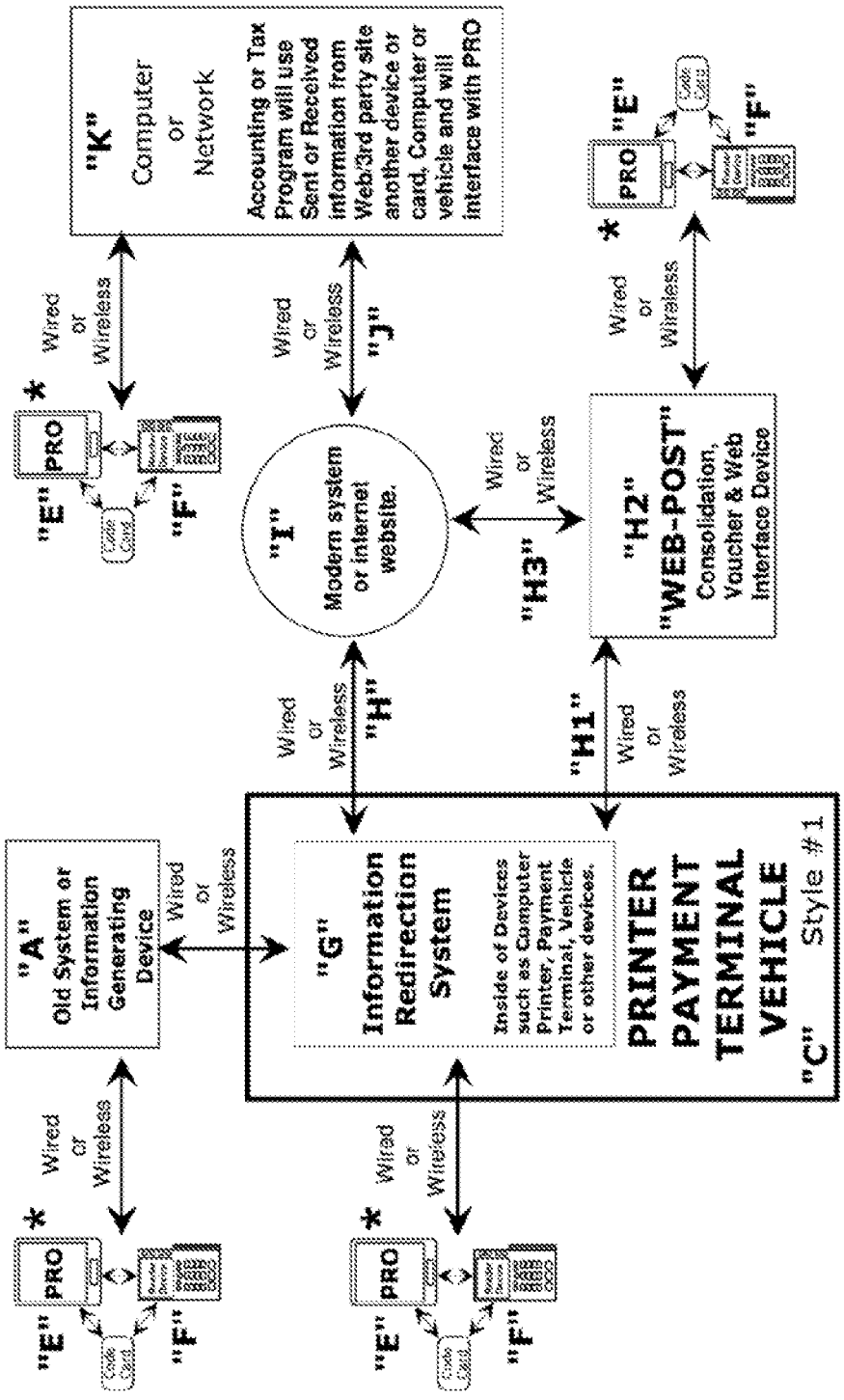
FIG. 1 is an embodiment of a printer interface that replaces a printer enabling a computer to connect to modem day systems.

The advantage of this invention is that there is no need to reprogram or in any way modify the old system. There are two styles of the same invention shown. Style #1 (as depicted in FIG. 1) is the Interface installed into a new Printer so you can connect old systems to new modem day systems or the internet by simply replacing the Printer. FIG. 1 is an embodiment of a printer interface that replaces a printer enabling a computer to connect to modem day systems.

Figure 2:
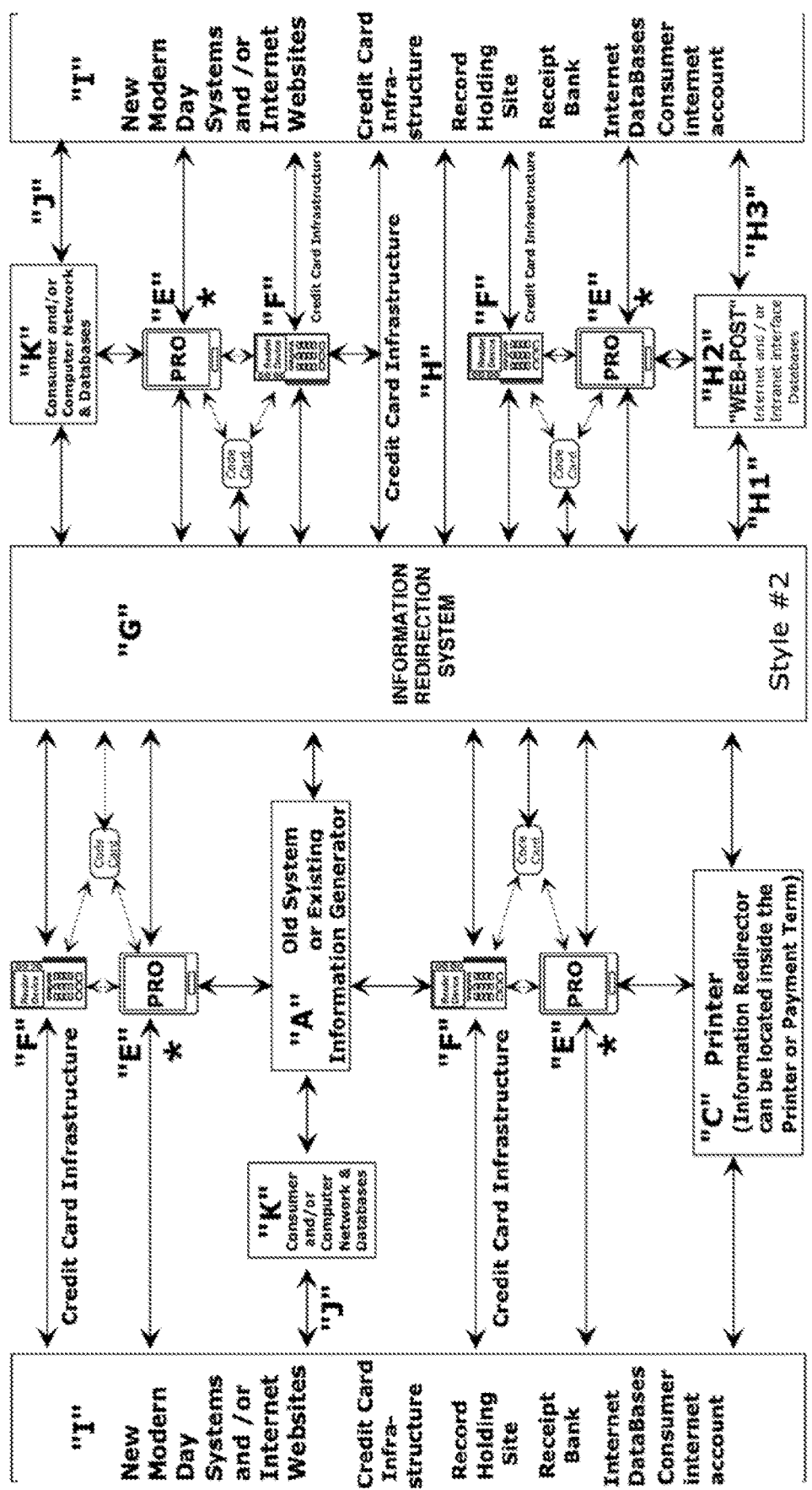
FIG. 2 is an embodiment of a printer interface that is connected between a computer and a printer enabling a computer to connect to modem day systems.

Style #2 (as depicted in FIG. 2) is the same interface that is connected between the old system and the old printer so you don't have to replace or modify anything. By simply adding the interface, you can use the old system and the old printer to connect old systems to new modem day systems or the Internet. FIG. 2 is an embodiment of a printer interface that is connected between a computer and a printer enabling a computer to connect to modem day systems.

Therefore, I will describe the operation of Style 1 (as depicted in FIG. 1), which in turn will describe Style 2 (as depicted in FIG. 2) with the same references.

Referring to FIG. 1: The user will unplug the old printer "C" from the existing printer cable "B" and plug in the new printer system "G" into the existing printer cable "B". The system is unchanged but now has the capability to transfer data to and from the modem day systems or an Internet website through wired or wireless pathway "H" and/or as an alternate pathway "H1" an Internet/intranet interface "H2" and pathway "H3". The data can also be sent to a hand held device or card "E". A reader "F" could read a hand held device or card "E" to get the address of the computer or website to send the information to.

Please note that the data is transmitted in both directions from and to "E", "F", "D", "G", "H", "HI" "H2", "H3", "I", "I", "K" and also from "G", "B" and "A".

Once the data is on a modem day system or website "I", it can be accessed via pathway "J" from computer "K" which could be a federal, state or city computer, an accountant's computer or a personal computer. Note that by using the Portable Record organizer, a hand held device or a card "E" you can transport the modem day information manually from computers or websites to a detached computer "K".

Transmission in either direction to the new printer system could be through magnetic coupling, direct contact, new or existing specifications such as USB, Bluetooth and wireless networking, radio waves, cell phones, visible light, infra red or any other means new or existing that uses the magnetic spectrum.

The PRO (for example, as shown in FIG. 3 & FIG. 4) works with the new printer system and could be any new or existing device (or card), an attachment to a device (or card) or even a software program for a new or existing device (or card). Some examples of these devices (but not limited to these) would be flash drives, memory cards, magnetic stripe cards, Smart cards, cell phones, PDA' or pocket computing devices.

FIG. 3 and FIG. 4 are described in the drawings. FIG. 3 shows how a consumer may obtain a hand held device and how a consumer may receive settlement information on a hand held device after making a purchase. FIG. 4 shows how a consumer may use the printer interface to transfer information to a hand held device enabling the consumer to engage in further transactions.

Note that in FIG. 4 we are using the PRO data as credit or payment though the printer system.

In the case of specially made device, it could be as simple as a modified flash drive or more specific such as a Portable Record Organizer (PRO) that could have special function buttons and a display and would be able to receive and/or transmit information to and/or from the new printer system which could itself transmit and receive from the internet, a network, an external location or even over the phone.

Some examples of the information received from the consumer could be Name, Address, City, State, Zip, Phone #, email address, credit card numbers, insurance numbers, social security numbers, business card information or any data that the consumer needs to give the seller, business person, company, friend or family member either at a location, over the phone, over the internet, from their personal computer or cell phone.

This of course would be protected from identity theft.

The second way is to transmit and or/receive information over the Internet from or to the new printer system. This could be done by sending or receiving to or from a consumer's internet account or sending or receiving to or from a "record holding site: such as a "Receipt Bank" where the consumer could upload or download information to or from their personal computer and/or PRO device or cell phone and/or the new printer system when they need to use it for returns, warranties, rebates, accounting or taxes.

This will be done in a quick "stair step" fashion for fast adoption and use. We can implement a quick and easy printer system interface that will enable us to use the information that was previously going to existing printers without modification to the existing system or its software.

This will consist of a connecting a new printer system that would receive and/or transmit information coming to the new printer system and enable sending it to a Portable Record Organizer as described above. This interface could be in line with or inductively coupled to the existing system.

This interface could also include any other means of receiving the information from the existing system. The design and interface for the new printer system could also be licensed to printer manufactures to be incorporated into their printers thereby giving extra value to their printers.

Neither of these uses would change the existing older system operation but would enable the immediate connection to all new modem Systems throughout the world and allow the consumer to electronically transmit and/or receive their information physically on a Portable Record Organizer, which is then downloadable to the consumer's personal Computer.

The next step would be to transmit and/or receive this information to or from the internet where it could be uploaded, stored and downloaded by using a code card or other protection device connected to the new data printer and needed for identity theft. It can be accessed and used at any accounting office or location virtual or physical designated by the owner or even on the owners own personal computer.

This could be done simply by using the above-mentioned physical devices. This device will connect to the Internet and "Print" the receipt, rebate, warranty, and other information to or from a storage site on the internet or intranet.

The next step would be to license the technology to developers to enable them to transmit the receipt through the existing "credit card system" that is in use all over the world.

Note: Using the existing Credit Card terminals, existing systems and Credit Card and Gift Card infrastructure for uses different than what they were originally designed for is also being claimed as part of the patent.

FIGS. 5-8 below are drawings of various features shown in the previously illustrated FIGs., but now illustrated in particular subsets or combinations, to better describe some of the scenarios desired.

Figure 5:
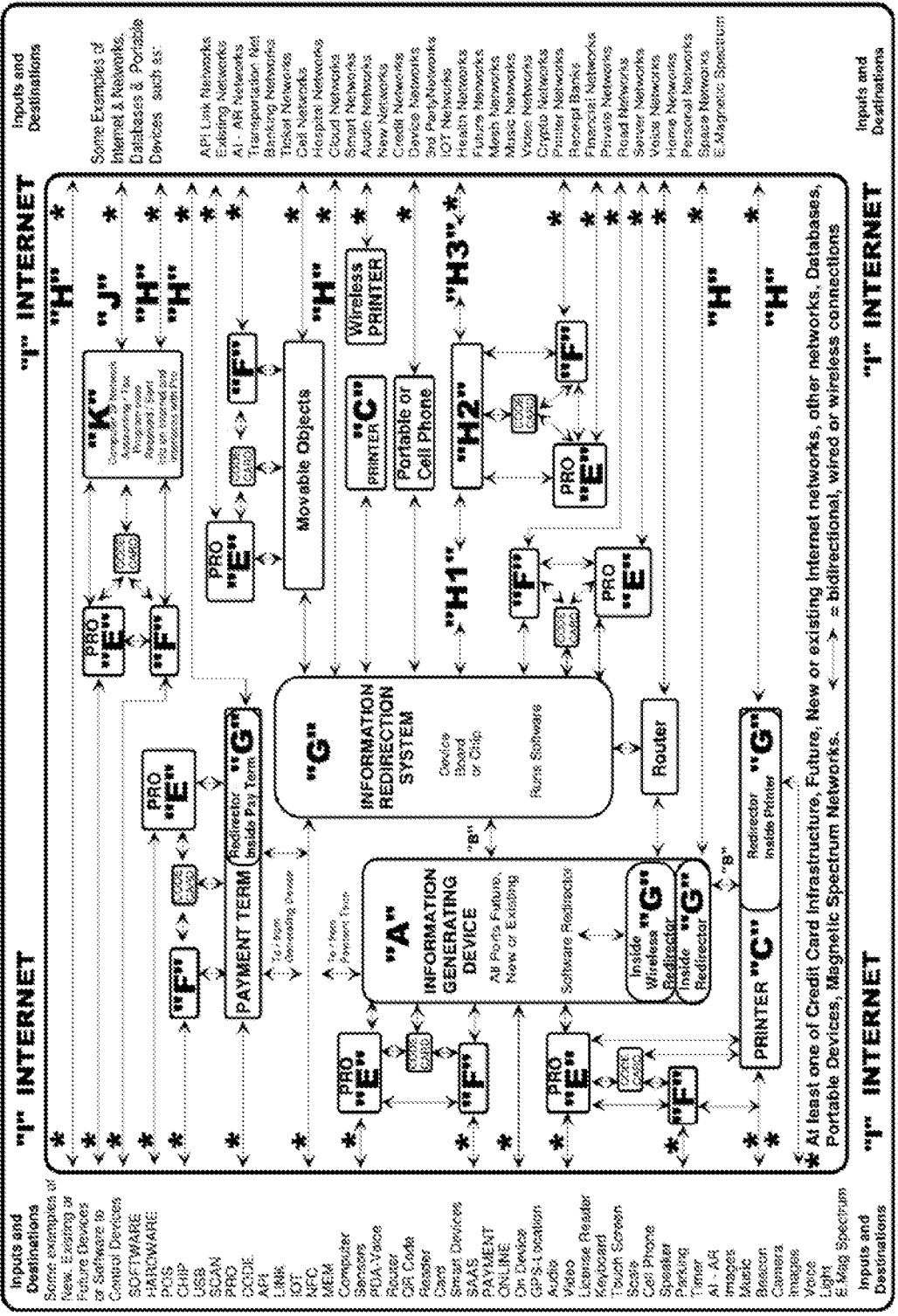
FIG. 5 is an illustration showing a particular subset of the previous FIGs.' configuration.
Figure 6:
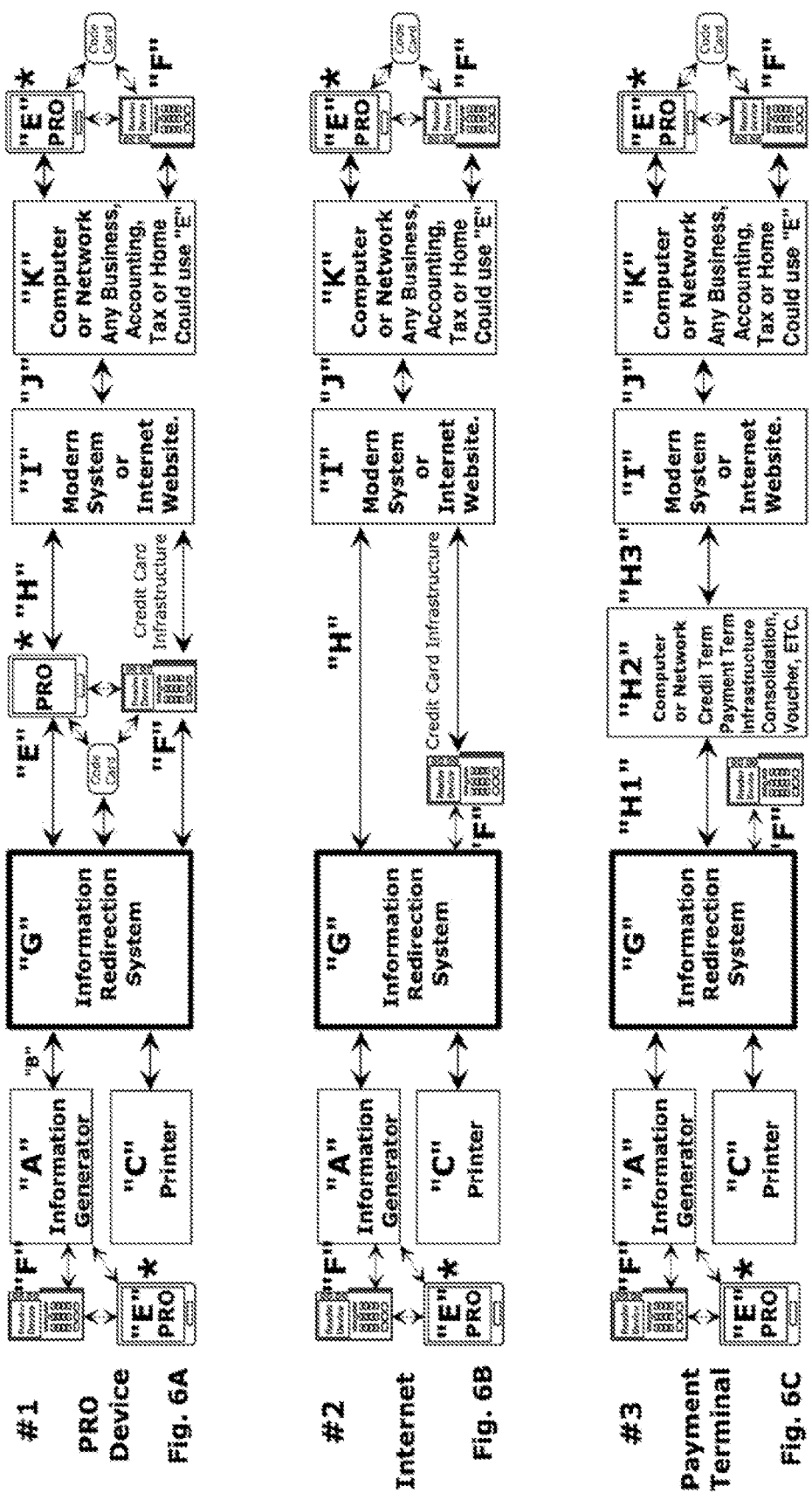
FIG. 6A shows a scenario #1, where "A" is connected to "G" via the previous "legacy" system's connection "B".
FIG. 6B shows a scenario #2, where the portable device of scenario #1 is removed from the data path, where "G" sends information directly to "I".
FIG. 6C shows a scenario #3, where the portable device of scenario #1 is removed from the data path and replaced with "H2".

FIG. 5 is an illustration showing a particular subset of the previous FIGs'. configuration. Existing computer system, point-of-sale, transaction device "A" is connected to the New Printer System "G" via a printer cable or some other connection type "B." As further discussed herein, the connection can be a USB connection, wireless, internal and any type of connection desired. Printout information from "A" is forward to "G" which is then forwarded unaltered or altered to any one or more of five different devices "C" (existing old printer), "H2" (Web-Post), "F" (Reader Device), "E" (Portable Device/Smart Phone), and "I" (Internet/Website). Any of the communications to the various different devices can be via wired and/or wired channels and can be bi-directional. "F" and "E" can be separately linked together, to exchange information, for example, "F" can be a credit/card reader, bar code scanner, or other device/memory reader. "H2" can communicate also with "I", to provide consolidation, Voucher, Web interface information, as needed.

"I" can receive information from "G", "E", "H2", as well as from "K" (computer network with software). It is noted that "E" can contain one or more "input" capabilities such as Magnetic card, chip, RFID, memory stick, Flash, Software input and so forth. "E" can communicate directly with "K" via its own channels or via "I".

FIGS. 6A-C show different pathway/device options. FIG. 6A shows a scenario #1, where "A" (existing computer/point-of-sale, transaction system) is connected to "G" (new printer system) via the previous "legacy" system's connection "B" (existing printer cable). "G" is placed intermediary to "A" and the "C" (existing printer) and can print to "C" if so desired. "G" takes printout information from "A" and can connect to "E" (portable device" via "D" (wired or wireless connection). Similarly, "F" (reader) is connected to both "G" and "E", where "F" can provide read information to "G" and/or "E". The portable device "E" may have software running on it to allow it to communicate information from "G" (and/or "F") to "I" (system/Internet Website)—presumably the Internet Cloud. "I" then can convey information with respect to the printout from "A" to "K" (computer or software). Here, it is understood that "E" may have software capabilities and commands that interact or provide instructions to "K". For example, printout information could be selected to be sent to a customer's specific business/personal program via an action choice in "E"'s program/menu. Of course, other possibilities and choices are possible.

FIG. 6B shows a scenario #2, where the portable device of scenario #1 is removed from the data path, where "G" sends information directly to "I". Also, "F" only corresponds with "G". A program may be placed in "G" that automatically sends the printout to the desired destination in "K" and/or "F" provides destination information. For example, a card reader (credit card company XYZ, as one possibility) would tell "G" to forward the printout information for the customer using the credit card to XYZ's software/account on "K" pertaining to the customer. Of course, other possibilities and choices are possible.

FIG. 6C shows a scenario #3, where the portable device of scenario #1 is removed from the data path and replaced with "H2" (computer or network or credit term, payment term infrastructure, consolidation, voucher, etc.). A terminal/computer with or without pertinent software can act as the gateway (with instructions/destination information) for the printout information.

The above FIGS. 6A and 6C illustrate different "mechanisms" or scenarios where the printout information is channeled or directed via an intermediary "E" or "H2" which can have destination and/or customer specific information as well as selection options for the customer. Of course, "F" can provide additional information, if so desired. FIG. 6B relies on "G" as the only intermediary to "I" (with "F" again providing additional information, if so desired).

FIGS. 7A-L are illustrations of alternative scenarios, showing specific embodiments. FIG. 7A shows "A" with a printer port being "plugged into" by "G" (new printer system), communicating wirelessly to "I" (modern device or Internet). "G" has one or more programs to assist in redirecting the printout information to the Internet.

FIG. 7B shows similar configuration to FIG. 7A, but "G" is connected via a wire/cable. Also, wireless communication is contemplated as via Wifi, Bluetooth, infrared, voice or any EM communication.

FIG. 7C shows similar configuration to FIG. 7B, but "I" is replaced by a modern device, shown here as a smart phone, hand held portable, etc. that is capable of running programs.

FIG. 7D shows similar configuration to FIG. 7C, but "I" is replaced by a modern device, shown here as a terminal device that can be a credit card, gift card, debit payment system that interfaces with conventional credit processing infrastructures.

FIG. 7E shows "I" replaced by a modern device, shown here as a modern printer (in contrast to the "existing printer"). Modern printers are generally wireless/net-capable. Additionally, the modern device can be a wireless gateway to the Internet.

FIG. 7F is similar to FIG. 7C, however, the modern device is understood to be programmable, running software and having a suite of communication programs, such as email, SMS, etc.

FIG. 7G is an extension of FIG. 7D, where modern device "I" is integral or related to credit card/financial institutions with computers/servers "K" providing support and processing of the printout information.

FIG. 7H is another extension of FIG. 7D, where modern device "I" is connected to the Internet "H2" where account or other information is returned from the Internet "H2" to instruct/manage the modern device's "I" handling of the printout information. As shown in this FIG., Credit information such as authorization for payment, purchase is facilitated. Of course, other types of information exchange is possible.

FIG. 7I is another embodiment, where the modern device "I" is located in vehicle. Various "receipt" scenarios are possible, for example, an Automated Teller Machine (ATM) could operate as part of "A"+"G" system.

FIG. 7J is another embodiment, where modern device "I" is a personal digital assistant (PDA) or similar device (including a voice-controllable device).

FIG. 7K is another embodiment, where the modern device is a combination of "E"+"I" (physical portable device with Internet) that interacts with the new printer system "G". Here, it is contemplated that information (e.g., credit) to a smart phone/cell device from the Web is also sent to payment terminal/modern device "I" that is connected to the new printer system "G".

FIG. 7L is a modification of the embodiment shown in FIG. 7K, where the new printer system "G" is connected to a receipt printer "C". Here, it is contemplated that information for a transaction, for example, receipts, warranties, refunds, coupons, discount (ads), or any such related information from the Web is forwarded to the receipt printer "C" for printout.

Figure 8:
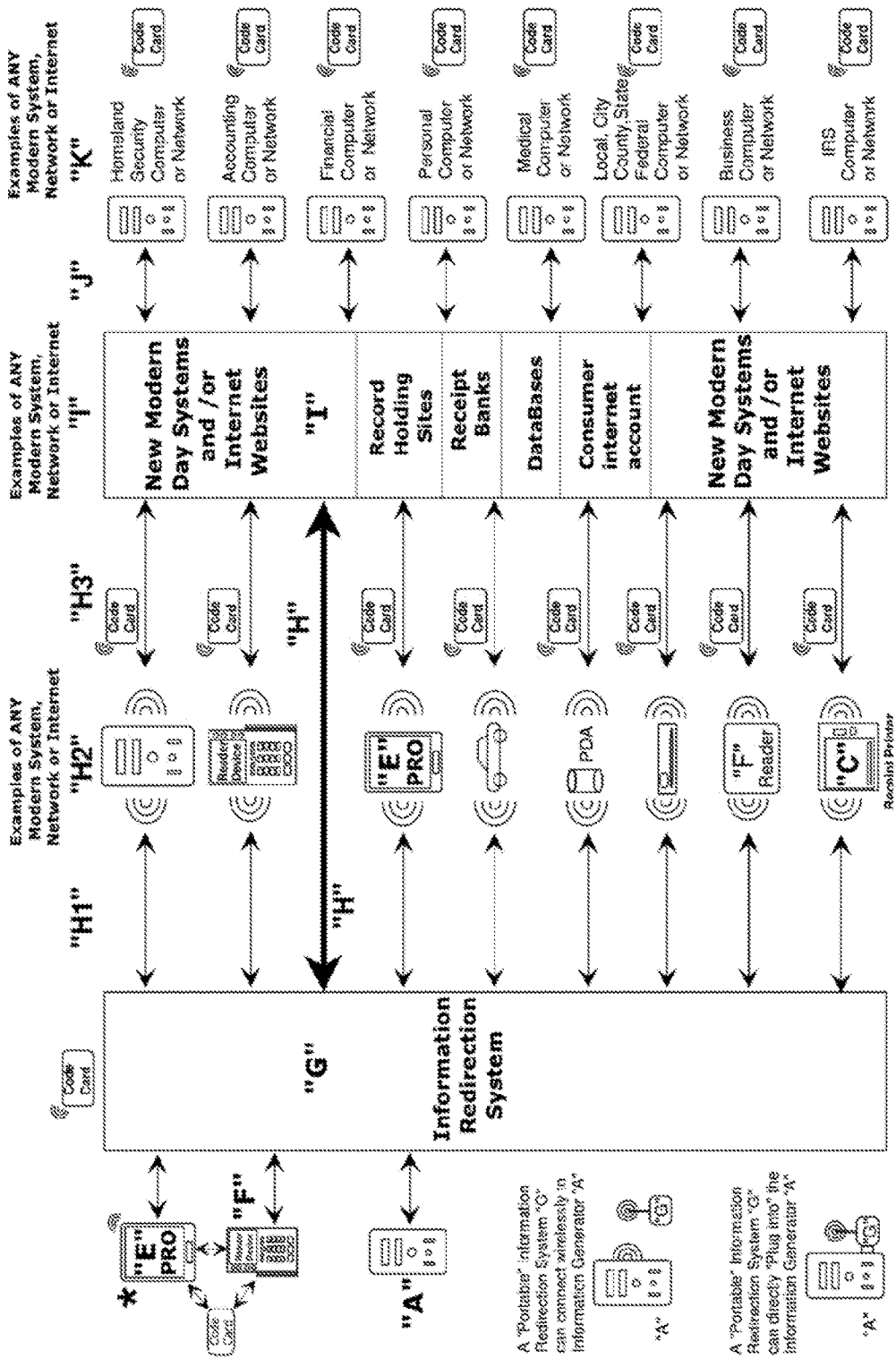
FIG. 8 is a multi-level diagram illustrating different examples of hardware within a system utilizing the exemplary new printer system.

FIG. 8 is a multi-level diagram illustrating different examples of hardware that may be instituted for connection and communication within a system utilizing the exemplary new printer system. For example, a printout generating device "A" is coupled directly by a "hard-wire" connection "B" to the new printer system "G", having either wired or wireless communication capabilities "H1 which can communicate to an intermediary device "H2" and from "H2" to a modern system/network/Internet "I", or directly to a modern system/network/Internet "I". As shown in the bottom left corner of FIG. 8, an embodiment is contemplated wherein the printout generating device "A" is plug-in coupled to the new printer system "G".

From "I" the printout from "A" and, optionally, any assorted commands, information from "G" and/or "H2" is forwarded wired or wirelessly "J" to a target modern system/ network/Internet "K" that may have servers, computers, databases that hold and/or process the printout information (with optional "G", "H2" information).

This configuration shows the various paths that the printout information can take to ultimately arrive at the servicing server/target system "K" and facilitate, for example, an "A" initiated transaction. The target system "K", during or after processing the forwarded information, can perform account verification, debits, credit, financial, accounting, security and other assorted actions to facilitate the initial transaction from the "A" system. As detailed above, the target system "K" can send a return signal or information content back to the various devices in the original path. Thus, a user can perform a purchase at "A", review the purchase at "H2" and perform any desired action, wherein the transaction details are forwarded to, for example, a credit card processor "K". Handshaking and transaction security/initiation/authorization can occur between "K" and "A" and "H2", wherein the user (on "H2") for example can authorize a initiated transaction from "A", which is forwarded to "K"—enabling "K" to complete the transaction activity. Thereafter, "A" can forward a receipt or other transaction detail (e.g., email, text, etc.) to "H2" as well as to "K", if so desired. Of course, "K" may send its record of the transaction directly to "H2". In view of the device/examples shown in FIG. 8, numerous other possibilities and options contemplated and available and understood to be self-explanatory.

Previous printers were designed to print a paper copy of data and/or receipts which causes a disconnect with modem day data manipulation. This printer can print data to and receive data from the internet and other modem day systems which will open up extremely fast data exchange and data manipulation for consumers, cities, states and the federal government without the expense of having to purchase complete new systems. By simply changing out an old printer we can connect all old computer systems with modem day systems that now have the ability to manipulate data automatically. Example: consumers and accountants no longer have to go through weeks of finding, sorting and compiling receipts of paper to do their taxes. The government can do extremely fast audits with far fewer auditors—automatically. Consumers pay only what they owe which can be collected immediately without a stressful audit for the consumer. The consumer can collect their refund immediately, which is needed to stimulate the economy at this time.

What is claimed is:

1. An information redirection system, requiring no alteration of the information generating device, comprising:
    a first information generated from a first device, transmitted wired or wirelessly via one or more bi-directional ports on the first device;
    an information redirector device, having
        one or more wireless transceivers configured to receive the first information and to transmit the first information to one or more target-destination devices,
    wherein the first information from the first device can be transmitted to the one or more target-destination devices without requiring a modification to the first device.

2. The information redirection system of claim 1, wherein the one or more wireless transceivers transmits the first information via wires.

3. The information redirection system of claim 1, wherein destination information for transmitting the first information is originated from at least one of a software program, memory, card reader, USB input, keyboard and computer resident on the information redirector device.

4. The information redirection system of claim 3, wherein the software is at least one of a redirection to a program, a link to another program, an app, and an API.

5. The information redirection system of claim 3, wherein the information redirector device is a portable device.

6. The information redirection system of claim 5, further comprising, function buttons and a display, disposed on the information redirector device.

7. The information redirection system of claim 1, wherein the first information is a printout data and in a digital format, adapted for one or more of sorting, searching, or formatting.

8. The information redirection system of claim 1, wherein one or more of the target-destination devices is an electronic receipt bank, wherein the first information is deposited to the receipt bank.

9. The information redirection system of claim 1, wherein the first device is at least one of a payment and transaction terminal.

10. The information redirection system of claim 1, wherein the first device is located in a mode of transportation.

11. The information redirection system of claim 1, further comprising a financial service or bank connected to the one or more of the target-destination devices, wherein the first information is at least one of settlement information including an amount of refund or money due to a transacting party, the amount being transmitted to the financial service or bank.

12. The information system of claim 1, wherein the first information is in an encrypted form prior to transmission or decrypted form after receipt.

13. The information redirection system of claim 1, wherein the information redirector is connected to an existing credit or transaction processing system.

14. The information redirection system of claim 1, wherein the information redirector device is proximal to at least one of a printer, payment terminal, transactional terminal, credit or gift card processing terminal, and computer that is providing the first information.

15. The information redirection system of claim 1, wherein the first information is transmitted via at least one of electromagnetic coupling, Bluetooth, infrared, light, and near field communications (NFC).

16. The information redirection system of claim 1, wherein the one or more of the target-destination devices is connected to the Internet.

17. The information redirection system of claim 1, wherein the one or more target-destination devices is a database.

18. The information redirection system of claim 1, wherein the first information is at least one of text, binary, data, images, video, beacons, media, email, SMS, coupon, warranty, sound, music, voice, payment information, Credit, Credit Card, Gift Card, loyalty, rebate, refund, invoice, Bank Check, Bank Certificate, financial, token, block chain, crypto currency, bitcoin, receipts, tickets, GPS, location, AI, health care information, and movable object information.

19. The information redirection system of claim 1, wherein the information redirector device is contained in one of a computing device, a circuit board, a computer chip, or software, or a software with a link to a program or API on an internet website.

20. The information redirection system of claim 1, wherein the information redirector device is located proximal to or inside the first device, wherein the first device is a one of a Printer, Payment Terminal, Transactional Terminal, or computing device.

21. The information redirection system of claim 1, wherein the first information is at least one of image capture, scan capture, Optical Character Recognition information.

22. The information redirection system of claim 21, wherein the first information is encrypted by the information redirector device.

23. The information redirection system of claim 1, wherein the information redirector device is within a mode of transportation, and further comprises at least one of a touch screen and voice capability to enable its use within the mode of transportation.

24. The information redirection system of claim 23, wherein the first information includes at least one of encrypted or unencrypted identity, identity verification, authorization, mileage, location, image, voice, video, text, SMS, financial information, payments for validating a transaction related to a use of the mode of transportation.

25. The information redirection system of claim 1, wherein the information redirector device is a software program loaded into the first device, providing instructions to convert data in the first information to be transmittable by the one or more wireless transceivers.

\* \* \* \* \*